Patented Aug. 7, 1951

2,563,609

UNITED STATES PATENT OFFICE 2,563,609

LUBRICATING OIL ADDITIVES

Alfred H. Matuszak, Westfield, N. J., assignor to Standard Oil Development Company, a corporation of Delaware No Drawing. Application January 28, 1949, Serial No. 73,445

3 Claims. (Cl. 252—56)

This invention relates to rust preventing oil compositions and more particularly to mineral lubricating oil compositions which tend to inhibit rusting and corrosion of metal parts which are exposed to moisture.

A primary object of the present invention is the preparation of compositions which may be employed as internal combustion engine lubricants and which will also serve for the protection of exposed surfaces of such engines when the same are not in use. When operating engines in climates having a high humidity, rusting begins within a very short period of time after the engine is shut down. The compositions of the present invention are particularly valuable in preventing such rusting, and they are valuable not only in the lubrication of internal combustion engines but with oil bases of suitable viscosity they may be employed as turbine oils or as lubricants for fire arms, ordnance equipment, industrial machinery, etc., and with more volatile oil bases and in combination with fatty substances they may be applied to form protective coatings for metal surfaces which are exposed to humid air.

The corrosion-preventing compositions of the present invention are formed by adding to a suitable oil base a mixed carbonate ester of a monohydroxy alcohol and a polyhydric alcohol wherein the monohydroxy alcohol portion of the mixed carbonate ester consists of a saturated or unsaturated alkyl or cycloalkyl radical and the polyhydroxy alcohol portion of the carbonate consists of a radical selected from the class of alcohols containing at least two hydroxyl groups and where the functional groups in the polyhydric alcohol portion may be partially or completely converted to other polar linkages such as ester, ether, or amide linkages when the presence of such linkages might impart certain desired properties to the mixed carbonate ester. Where the mixed carbonate ester of this invention contains one or more free hydroxyl groups in the polyhydroxy alcohol portion of the carbonate, it is preferred in this invention to have at least one of these free hydroxyl groups esterified with a carboxylic acid. Such a mixed carbonate ester wherein at least one free hydroxyl group has been converted to an ester group may be called an ester-carbonate and such an ester-carbonate may be formed by esterifying at least one hydroxyl group of the polyhydroxy alcohol with a carbonic acid derivative of a monohydroxy alcohol and esterifying at least one hydroxyl group of the polyhydroxy alcohol with a carboxylic acid. In many cases, the anhydride, acid chloride or ester of the desired carboxylic acid may be employed instead of the carboxylic acid in well-known esterification processes to produce the mixed carbonate esters of this invention.

Where the polyhydroxy alcohol is a diol, the resulting mixed carbonate ester is formed by esterification of the diol either partially or completely with a carbonic acid derivative of a monohydroxy alcohol, employing well-known esterification methods. Where the hydroxyl groups of the diol are only partially esterified in preparing the mixed carbonate ester, the residual or free hydroxyl group may be converted to an ester linkage by esterification with a desired carboxylic acid or a derivative thereof.

Where the polyhydroxy alcohol contains more than two hydroxyl groups, the polyhydroxy alcohol may be partially or completely esterified with a carbonic acid derivative of a monohydroxy alcohol. The resulting mixed carbonate ester must contain at least one carbonic acid radical and may contain one or more carboxylic acid radicals. Where an ester-carbonate is desired, it is generally preferable to first partially esterify the polyhydroxy alcohol with the desired carboxylic acid, as this will generally produce a liquid product which can be conveniently handled in the subsequent esterification with the carbonic acid derivative of a monohydroxy alcohol. It will be understood that in the preparation of the mixed carbonate esters of this invention the carbonic acid derivative employed may consist of a mixture such as that which may be obtained by physically combining several pure carbonic acid derivatives or that which may be obtained by employing a mixture of monohydroxy alcohols in the preparation of the carbonic acid derivative reactant. It will be further understood that where an ester-carbonate is desired, one or more than one carboxylic acids or derivatives thereof may be employed. In the preparation of these esters it is preferred to employ monocarboxylic acids. However, dicarboxylic acids may be employed instead of, or along with, the monocarboxylic acids. In the latter case, dicarboxylic acids containing 0 to 8 carbon atoms in the chain between the two carboxyl groups are preferred. Where dicarboxylic acids are employed, normal esterification, linear esterification or cross linkage esterification may occur.

In the preparation of the mixed carbonate esters of the present invention any carbonic acid derivative of a monohydroxy alcohol or mixture of monohydroxy alcohols and any polyhydroxy alcohol may be employed. The carbonic acid derivatives of monohydroxy alcohols which are to be employed in the preparation of the mixed carbonate esters of this invention include any carbonic acid derivative of a monohydroxy alcohol containing a saturated or unsaturated aliphatic or cycloaliphatic hydrocarbon chain of 1 to 30 carbon atoms per molecule. The preferred number of carbon atoms in the monohydroxy alcohol portion of the carbonic acid derivative generally will be 8 to 20 carbon atoms; however, where the mixed carbonate ester contains other long hydrocarbon chains such as may be obtained when a long chain fatty acid is employed to produce an ester-carbonate, the number of carbon atoms in the monohydroxy alcohol portion of the carbonic acid derivative generally will be less than 8 carbon atoms. The carbonic acid derivatives of monohydroxy alcohols may be conveniently prepared by the reaction of phosgene in the presence of pyridine with monohydroxy alcohols to give alkylchlorocarbonates or dialkylcarbonates. The monohydroxy alcohols which may be utilized in the preparation of these carbonic acid derivatives may be saturated or unsaturated and may be individual alcohols or mixtures of alcohols such as may be obtained by physically mixing several alcohols or by the reduction of naturally occurring fatty esters, or by the fermentation process, or by the reduction of an olefin with carbon monoxide and hydrogen as in the "Oxo" process. Among the more preferred examples of monohydroxy alcohols may be mentioned ethyl, propyl, allyl, amyl, 2-ethylhexyl, 2-ethylbutyl "Cellosolve," $C_8$ Oxo, $C_9$ Oxo, $C_{13}$ Oxo, cetyl, oleyl, octadecyl, myristyl, linoleyl, erucyl and lauryl alcohols, also furfuryl, tetrahydrofurfuryl, and cyclohexanol alcohols. The polyhydroxy alcohols which are to be used in the preparation of the mixed carbonate esters of this invention are selected from the class of polyhydroxy alcohols containing at least two hydroxyl groups. Such polyhydroxy alcohols may contain besides the hydroxyl groups additional groups such as nitro, carboxylic, ester, amide, ether, pyridyl, quinolyl, phenyl, sulfonate and primary, secondary, and tertiary amino groups in the molecule. A preferred group of polyhydroxy alcohols comprises those alcohols containing four and five hydroxyl groups per molecule, among which pentaerythritol, sorbitan and tetramethylolcyclohexanol are especially suitable examples. As further illustrations of polyhydroxy alcohols which may be conveniently employed in accordance with the present invention may be mentioned ethylene glycol, propylene glycol, 1,3-propanediol, pentaglycerol, glycerol, diglycerol, polyglycerol, tetramethylolcyclopentanol, anhydro-ennea-heptitol, 2-amino-2-methylol-1,3-propanediol, benzotrimethylol, 2,2-dimethylol-3-hydroxy-n-propylbenzene, o-tertiary-tri-hydroxybutyl pyridine, triethanolamine, methyl diethanol amine, sorbitol, inositol, dipentaerythritol, polypentaerythritol, tris(hydroxymethyl) nitromethane, 2-methyl-2-nitro-1,3-propanediol and 2-ethyl-2-nitro-1,3-propanediol.

Where ester-carbonates are desired, the carboxylic acids which are suitable for the preparation of the rust inhibiting compositions of the present invention include any aliphatic or cycloaliphatic carboxylic acids having 1 to 30 carbon atoms per molecule and these include saturated as well as unsaturated acids having one or two carboxyl groups. Among the more preferred examples of monocarboxylic acids may be mentioned acetic, butyric, valeric, lauric, palmitic, stearic, oleic, linoleic, ricinoleic, eleomargic, erucic, behenic, arachidic, lignoceric and similar fatty acids, also the naphthenic acids, as well as carboxylic acids derived by the oxidation of petroleum products or by the oxidation of aldehydes such as those produced in the Oxo process. Naturally occurring products containing any of the above or similar acids, such as talloil, castor oil, soybean oil, linseed oil, olive oil, tung oil, rapeseed oil, menhaden oil and the like, or acids derived therefrom may be conveniently employed. Dicarboxylic acids such as succinic acid, maleic acid, fumeric acid, azelaic acid, and sebacic acid may likewise be employed.

Some specific examples of ester-carbonates wherein a mixed carbonate ester is further esterified with a carboxylic acid as described above are: pentaerythritol mono-oleate mono-allylcarbonate, pentaerythritol di-oleate mono-petroleumcarbonate mono-ethylcarbonate, pentaerythritol mono-laurate mono-hexyl-carbonate, tetramethylolcyclohexanol mono-oleate mono-allylcarbonate, sorbitan mono-oleate mono-allylcarbonate, glycerol mono-stearate mono-allylcarbonate, and dipentaerythritol mono-oleate di-$C_9$ "Oxo" carbonate, pentaglycerol mono-tall oil ester mono-allylcarbonate, triethanol amine mono-stearate mono-allylcarbonate and tris(hydroxy methyl) amino methane mono-stearate mono-allylcarbonate.

The additives of the present invention may be advantageously employed with petroleum fractions of a wide variety, although their preferred use is in lubricating oil bases to form lubricant compositions which also act as corrosion preventives. The base stocks may be derived from various types of crude petroleum and may consist of distillates or blends of various kinds which have been refined by any of the conventional methods. Synthetic oils may also be used such as those obtained by the polymerization of olefins or by the hydrogenation of coal or its products. In the case of lubricants, the base stock chosen will normally be that oil which without the new additives gives the optimum performance in the service contemplated. These base oils may vary considerably in viscosity and other properties depending upon the particular uses for which they are desired. For crankcase use they usually range from about 40 to 130 seconds viscosity Saybolt at 210 F. The viscosity index may range from less than 0 to 130 or even higher. Turbine oils usually have a viscosity of 40 to 60 seconds Saybolt at 210° F. Use may also be found in torque converter fluids having a viscosity of 35 to 45 seconds at 210° F. and a viscosity index of 155 to 170. Corrosion-preventing compositions other than lubricating oils may comprise base stocks of a wide variety with respect to viscosity and may consist of mixtures of base stocks, as in slushing oils, which may consist of a mixture of naphtha and lubricating oil and may contain small amounts of petrolatum or a fatty compound such as degras.

In addition to the materials to be added to the base stock according to the present invention, other agents may be present in lubricating compositions and other corrosion-preventing compositions, such as heat-thickened fatty oils, sulfurized oils, organo-metallic compounds, metallic or other soaps, sludge dispersers, antioxidants, thickeners, viscosity index improvers, pour point depressors, oiliness agents, resins, olefin polymers and colloidal solids such as graphite or zinc oxides. Solvents and assisting agents such as esters, ketones, alcohols, aldehydes, halogenated and nitrated compounds and the like may also be employed.

For the purpose of the present invention, the esters described herein are added to the base stock in proportions preferably ranging from 0.01% to 10% by weight and in some cases larger proportions may be employed to advantage.

The esterification of the polyhydroxy alcohols used in the present invention is carried out in such a manner that at least one and preferably not more than 1 hydroxyl group per molecule is condensed with the carbonic acid derivative of a monohydroxy alcohol. It is understood, however, that because of the high concentration of polar groups in these alcohols, more than one functional group per molecule may react with the carbonic acid derivative of a monohydroxy alcohol. For instance, where an amino group is present, a urethane may be formed concurrently with the mixed carbonate ester. However, when secondary products arise, they are present in very low concentration and, generally, do not affect the inhibiting properties of the primary mixed carbonate ester adversely but rather tend to increase the effectiveness and solubility of the desired mixed carbonate ester in its base oil.

Where pronounced oil solubility is desired or an increased number of polar linkage is necessary to impart certain desired properties to the additive, the manner of treating the functional groups of the polyhydroxy alcohol may be modified so that, in addition to the formation of the mixed carbonate ester, other polar groups, especially hydroxyl and/or amino groups, are condensed with, for instance, a saturated or unsaturated monocarboxylic acid anhydride, ester or an acid chloride to form an ester-carbonate which is a preferred compound in this invention as stated previously, and/or an amide, or with an alkyl halide to form an ether and/or an amine, or with an alkyl chlorocarbonate to form a di- and/or tricarbonate and/or a urethane, or with a sulfonic acid or a sulfonyl chloride to form a partial sulfonate and/or a sulfonamide, or with an aldehyde to form an acetal and/or a Schiff's base, or with carbon disulfide and an alkali to give a xanthate and/or a thiocarbamate which may be followed by reaction with an alkyl halide, acid chloride, chloromethyl ether, chloracetic acid ester, chlorethyl ester or an alkyl chlorocarbonate to give the corresponding xanthate and/or thiocarbamate derivative. In addition to the above reactions, increased chain lengthening may be accomplished in the presence of a suitable catalyst by condensing a long chain mercaptan with the mixed carbonate ester providing it has an ethylenic bond on one side of the carbonate linkage. Because of the many different linkages that may be introduced into the mixed carbonate ester molecule, it will be recognized as a further disclosure of this invention that any combination of the above-cited linkages may be utilized in the mixed carbonate ester by properly selecting the initial reactants in order to obtain the ultimate in additive effectiveness.

The following example illustrates the application of the present invention as an additive material suitable for inhibiting rust formation in internal combustion engines.

Example I

To 200.3 g. (½ mol) of pentaerythritol mono-oleate (prepared by esterifying equal molecular quantities of penterythritol and oleic acid) in a one liter 4 necked flask equipped with a stirrer, thermometer, separatory funnel, nitrogen inlet tube, and reflux condenser were added 200 g. of toluene and 80 g. (1 mol) of pyridine. To the stirred mixture cooled to 10° C. was added 60.3 g. (½ mol) of allylchlorcarbonate (ClCOOC$_3$H$_5$). Addition was made dropwise over a period of 20 minutes with the temperature being held at 10° C. The mixture was stirred for 1 hour with the temperature at 3° C. and then was allowed to remain at room temperature for 16 hours. The white crystals of pyridine hydrochloride (60 grams, approximately ½ mol) were separated by suction filtration and washed with 200 g. of toluene. The toluene solution was washed thoroughly with dilute hydrochloric acid, saturated sodium carbonate solution, and finally with water until it was neutral to litmus paper. The toluene was distilled off under a reduced pressure of 30 mm. The product was a clear light amber colored liquid weighing 227 g. (94% yield).

Analyses of this product for carbon and hydrogen content and inspection for saponification number and netralization number were performed. The following data were obtained:

|  | Found | Theoretical |
|---|---|---|
| Saponification Number, mg. KOH/g | 243.2 | 231.6 |
| Neutralization Number, mg. KOH/g | 0.38 | 0.0 |
| Carbon, Per Cent | 70.95 | 66.8 |
| Hydrogen, Per Cent | 10.56 | 9.9 |

This product was then evaluated for its rust inhibiting properties by employing it in a 1 wt. percent concentration in a phenol treated Mid-Continent oil which was then used as a crankcase oil in a single cylinder Wisconsin engine. After running the engine for 8 hours with this test oil, the cylinder was removed from the engine and stored in a Tenney humidity cabinet kept at conditions of temperature and humidity which are known to favor rusting and which simulate a typical summer day in Cuba. After each of the first five 24-hour cycles, the amount of rusted area developed was determined and recorded as the per cent of the total cylinder barrel area rusted. Three evaluations were made on this product. For comparative purposes, the base oil alone and with 1% pentaerythritol mono-oleate were also evaluated in the same manner.

After five days' storage in the humidity cabinet, the average rust observed with the blends containing 1% pentaerythritol mono-oleate mono-allylcarbonate was only 4% of the total cylinder barrel area. This was substantially better than the 10% obtained with a blend containing 1% pentaerythritol mono-oleate and considerably better than the 30% rusting obtained with the base oil. The complete data are tabulated below.

| Test | Additive in Base Oil, Wt. Per Cent | Per Cent of Total Cylinder Barrel Area Rusted | | | | |
|---|---|---|---|---|---|---|
| | | Days Storage | | | | |
| | | 1 | 2 | 3 | 4 | 5 |
| A | 1% Pentaerythritol Mono-Oleate Mono-Allylcarbonate. | 1.5 | 2 | 3 | 3 | 3.5 |
| B | do | 0.5 | 0.5 | 0.5 | 1 | 1.5 |
| C | do | 3 | 4 | 6 | 7 | 7 |
| D | 1% Pentaerythritol Mono-Oleate. | 1 | 3 | 5 | 8 | 10 |
| E | None | 5 | 10 | 15 | 22 | 30 |

These data clearly demonstrate that the addition of the allylcarbonate linkage enhances the rust inhibiting effectiveness of the pentaerythritol mono-oleate molecule in such a manner that blends containing pentaerythritol mono-oleate mono-allylcarbonate afford greater rust inhibition in this test than the base oil or blends containing the same weight per cent of pentaerythritol mono-oleate.

What is claimed is:

1. A mineral lubricating oil containing dissolved therein 0.1% to 10% of pentaerythritol mono-oleate mono-allylcarbonate.

2. A mineral lubricating oil containing dissolved therein about 1% by weight of pentaerythritol mono-oleate mono-allylcarbonate.

3. The process which comprises reacting pentaerythritol with a sufficient amount of oleic acid to esterify at least one hydroxyl group of said pentaerythritol and subsequently reacting the product thus formed with a sufficient amount of chloroallylcarbonate to esterify at least an additional hydroxyl group of said pentaerythritol.

ALFRED H. MATUSZAK.

REFERENCES CITED

The following references are of record in the file of this patent:

UNITED STATES PATENTS

| Number | Name | Date |
|---|---|---|
| 2,153,137 | Dickey | Apr. 4, 1939 |
| 2,371,333 | Johnston | Mar. 13, 1945 |
| 2,414,400 | Strain | Jan. 14, 1947 |